US005411462A

United States Patent [19]

Link

[11] Patent Number: 5,411,462

[45] Date of Patent: May 2, 1995

[54] LIGHTWEIGHT INK TRANSFER ROLL

[76] Inventor: Terry G. Link, 421 Hempstead Pl., Charlotte, N.C. 28207

[21] Appl. No.: 114,136

[22] Filed: Aug. 30, 1993

[51] Int. Cl.[6] .................. B23P 15/00

[52] U.S. Cl. .................. 492/30; 492/47; 492/54; 492/58

[58] Field of Search .................. 492/30, 31, 34–37, 492/47, 53, 54, 58, 59

[56] References Cited

U.S. PATENT DOCUMENTS

| | | | |
|---|---|---|---|
| 2,787,956 | 4/1957 | Kerby et al. | 492/47 |
| 3,019,511 | 2/1962 | Hornbostel . | |
| 3,556,005 | 1/1971 | Koch | 492/47 |
| 4,301,583 | 11/1981 | Poole | 492/35 |
| 4,567,827 | 2/1986 | Fadner . | |
| 4,586,224 | 5/1986 | Sartor et al. | 492/35 |
| 4,641,411 | 2/1987 | Meuler | 492/30 |
| 4,793,041 | 12/1988 | Jenkins et al. | 492/37 |
| 4,862,799 | 9/1989 | Hycner et al. . | |
| 4,991,501 | 2/1991 | Yokoyama et al. | 492/37 |
| 5,001,821 | 3/1991 | Herb | 492/37 |
| 5,123,350 | 6/1992 | Fadner | 492/37 |
| 5,133,125 | 7/1992 | Dubils et al. | 492/47 |
| 5,134,939 | 8/1992 | Borne . | |
| 5,169,450 | 12/1992 | Opad et al. | 492/47 |

*Primary Examiner*—Irene Cuda

*Attorney, Agent, or Firm*—Bell, Seltzer, Park & Gibson

[57] ABSTRACT

A lightweight ink transfer roll adapted for use in a flexographic printing apparatus. The roll includes an aluminum body member having a cylindrical outer surface, tubular opposite end portions, and a solid medial portion which forms a mid span-stiffener in the roll. An aluminum header is fixed in each of the tubular end portions, and each of the headers has an inner end surface which is spaced from the solid medial portion of the body member so as to leave an open void therebetween. An outer covering layer, of for example aluminum oxide or a flame sprayed ceramic, overlies the outer cylindrical surface of the body member, and a plurality of ink metering cells are formed in the outer covering layer. Preferred methods of fabricating the roll are also disclosed.

16 Claims, 4 Drawing Sheets

LIGHTWEIGHT INK TRANSFER ROLL

BACKGROUND OF THE INVENTION

The art of printing involves reproducing an image by repeatedly transferring ink from an object bearing a master image to the substrate being printed upon, such as paper. There are many different ink transfer processes used in printing to transfer the ink from the image to the substrate, including relief, planographic, gravure (or intaglio), screen and electrostatic.

The relief process of printing involves forming a printing plate bearing the master image by relieving those portions of the plate that will not transfer ink. Thus, the non-relieved areas are those raised portions of the plate that will retain ink when the plate is pressed against a surface coated with ink. The printing plate is subsequently brought into contact with the paper and the inked, raised areas will transfer the image to the paper.

One form of relief printing is flexography. In flexographic printing, a flexible printing plate bearing the master image is mounted on the surface of a printing plate cylinder. In operation, the printing plate cylinder rotates so that the printing plate is brought into rolling contact with the substrate to be printed and will print one image for each revolution of the plate cylinder. An ink transfer roll is also positioned in rolling contact with the printing plate on the plate cylinder and resupplies ink to printing plate after it has printed an image on the substrate.

Ink transfer rolls are formed with a textured surface of small pits or cells that continuously pick up ink from an ink reservoir and apply that ink to the printing plate surface. The ink metering cells increase the volume and enhance the uniformity of the layer of ink transferred by the ink transfer roll.

Ink transfer rolls are conventionally formed of steel. Steel rolls are heavy, and their weight can render it difficult for the operator to intermittently change rolls as the printing operation may require, and the weight of the rolls can result in personal injury to the printing press operator. In addition, the weight of the steel rolls will occasionally cause the press operator to strike the rolls against hard objects such as the floor or the press itself and chip the edges of the printing surface, often rendering the roll unusable. Steel rolls are also subject to corrosion that can pit the ink transfer surface or bearing journals.

Conventional steel rolls are often coated with a ceramic surface layer, such as flame sprayed chromium oxide, that provides a hard, wear resistant rolling surface. The chromium oxide layer can be mechanically engraved to form the ink transfer cells. Alternatively, the chromium oxide layer can be engraved with a laser engraving machine that directs bursts of light energy onto the surface to form the desired pattern of cells. Laser engraving allows custom engraving with precise control over cell geometry, volume and alignment.

Ink transfer rolls made of steel are typically manufactured from standard hollow steel tubing to minimize material costs and unnecessary weight. Headers are inserted at either end of the tube and include journals that seat the roll on journal bearings in the printing press.

A close dimensional tolerance is required in ink transfer rolls to ensure that an even coating of ink is applied to the printing plate and that the rolls are dynamically balanced at high speeds. More particularly, a dynamically imbalanced roll can "bounce" when rotated at relatively high speed, and such bouncing can result in poor print quality since the roll is only intermittently in proper contact with the printing plate. Standard steel tubing, however, has relatively loose tolerances for roundness of the outside diameter and for concentricity of the outside diameter with the inside diameter. Thus, the outside diameter of a conventional ink transfer roll must be machined before it is engraved to obtain the necessary degree of roundness. In addition, weights usually must be positioned within the roll to correct for the unbalance caused by the lack of concentricity with the inside diameter.

An aluminum ink metering roller for use in lithographic printing has been proposed by Hycner et al. in U.S. Pat. No. 4,862,799. The '799 patent discloses a hollow aluminum base roll whereon ink transfer cells are formed by mechanical or diamond-stylus engraving. The engraved aluminum roll is then anodized to form a hard and wear resistant aluminum oxide surface layer, and this surface layer is coated with a thin and relatively soft copper layer to give the roll the necessary hydrophobic and oleophilic qualities required by lithographic printing.

As noted above, the ink transfer rolls used in flexographic printing are most commonly made from hollow steel tubing. Rolls made from aluminum or other lightweight materials have not been generally used since such rolls are not as strong as a corresponding steel roll and may allow undesirable flexing of the roll, particularly when used in a flexographic process. For example, an insufficiently stiff roll can be deflected or bowed by the hydraulic pressure of the ink being squeezed at the nip, and the resulting bowing of the roll can also create uneven inking of the printing plate and thus poor print quality.

It is accordingly an object of the present invention to provide a lightweight ink transfer roll adapted for use in a flexographic printing operation that overcomes the above noted deficiencies of the prior art rolls.

It is a further object of the present invention to provide a lightweight ink transfer roll of the described type which is easy to manually handle by press operators, thereby providing for quicker and easier press set up and clean up, reduced operator injuries, and reduced incidence of accidental edge chipping and damage to the roll.

It is a more particular object of the present invention to provide a lightweight ink transfer roll of the described type which, by reason of its light weight, possesses low dynamic inertia and low dynamic imbalance, thereby permitting the roll to run smoothly and to minimize bounce and vibration in the system which can lead to poor print quality.

It is another object of the present invention to provide lightweight ink transfer roll of the described type wherein the roll has sufficient stiffness to avoid bowing resulting from its contact with the printing plate and the hydraulic pressure at the nip.

It is still another object of the present invention to provide an efficient method of manufacturing an ink transfer roll having the described advantages and properties, and wherein the method produces a dynamically balanced product without the need for a post manufacturing balancing operation.

SUMMARY OF THE INVENTION

These and other objects and advantages of the present invention are achieved in the embodiments illustrated herein by the provision of an ink transfer roll which comprises a metallic body member which includes an outer cylindrical surface, tubular opposite end portions, and a solid medial portion which is integrally formed with the remainder of the material of the body member and which forms a closed inner end wall for each of the tubular end portions. A header is fixed in each of the tubular end portions, and each of the headers includes an external journal. Also, the journals of the headers are coaxially aligned with each other and with the outer cylindrical surface of the body member.

The headers each include an inner end surface which opposes the inner end wall of the associated tubular end portion, and with the inner end surface of each of the headers being axially spaced from the inner end wall of the associated tubular end portion a substantial distance so as to leave an open void therebetween. In the preferred embodiment, the open voids collectively have a total axial length which equals at least about ½ the axial length of the body member.

The roll of the present invention is preferably formed of aluminum or an aluminum alloy, and the roll further comprises an outer covering layer of for example aluminum oxide or a flame sprayed ceramic such as chromium oxide, which overlies the outer cylindrical surface of the body member and so as to define an outer surface. A plurality of ink metering cells are formed in the outer surface of the outer covering layer, preferably by laser engraving, and the depth of the ink metering cells is less than the overall thickness of the outer covering layer.

The roll of the present invention may be fabricated by a method which includes drilling into each of the ends of a solid base roll so as to form the tubular opposite end portions and the solid medial portion between the tubular end portions. A pair of headers are provided, each having a cylindrical mounting end portion and a journal at the opposite end portion, and the headers are mounted into the tubular opposite end portions of the base roll and so that the journals extend outwardly from the base roll. An outer covering layer is then formed on the outer surface of the base roll, which may comprise aluminum oxide in the case of an aluminum base roll or a suitable flame sprayed ceramic material, and the outer surface is then laser engraved to form a plurality of ink metering cells.

BRIEF DESCRIPTION OF THE DRAWINGS

Some of the objects and advantages of the present invention having been stated, others will appear as the description proceeds when taken in conjunction with the accompanying drawings, in which.

DETAILED DESCRIPTION OF THE PREFERRED EMBODIMENT

Figure 1:
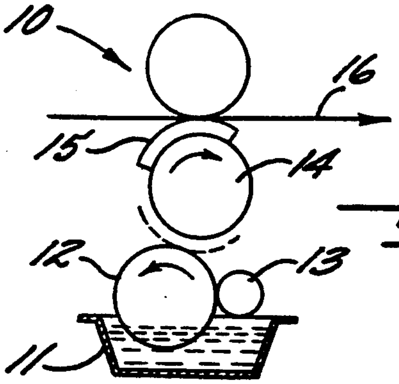
FIG. 1 is a side elevation schematic view of a conventional flexographic printing operation.

Referring more particularly to the drawings, FIG. 1 illustrates a conventional flexographic printing apparatus 10, which comprises an ink reservoir 11, an ink transfer roll 12 which is partially immersed in the ink reservoir, a doctor roll 13 contacting the ink transfer roll, and a printing plate cylinder 14 which mounts a flexible printing plate 15 on its surface. The printing plate cylinder 14 is positioned so that the printing plate 15 is in rolling contact with the ink transfer roll 12 as well as the substrate 16 upon which the images are to be printed, and a back up roll 17 supports the advancing substrate 16 in contact with the printing plate 15.

In flexography, the master image is formed on the flexible printing plate 15 by relieving those parts of the plate that will not transfer ink to the substrate, i.e., the non-image areas. Fresh ink is resupplied to the printing plate 15 from the ink reservoir 11 via the ink transfer roll 12. One side of the roll 12 is submerged in the ink reservoir 11 and picks up ink as it rotates therethrough, and the doctor roll 13 is positioned to contact the roll 12 and spread the ink uniformly on its surface. The opposite side of the ink transfer roll 12 is held in an abutting relationship with the printing plate 15, thus continually supplying fresh ink to the printing plate.

To ensure that a sufficient quantity of ink is supplied with proper uniformity to the printing plate, the ink transfer roll 12 is textured with a multitude of small ink metering cells, as further described below. These ink metering cells must be precisely formed to allow adequate and uniform ink transfer from the reservoir 11 to the printing plate 15.

Figure 2:
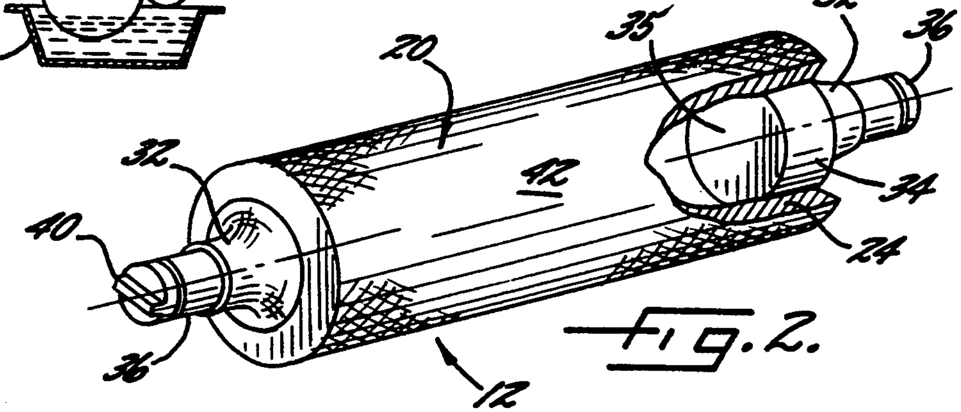
FIG. 2 is a perspective view, with parts broken away, of an ink transfer roll which embodies the present invention.
Figure 3:
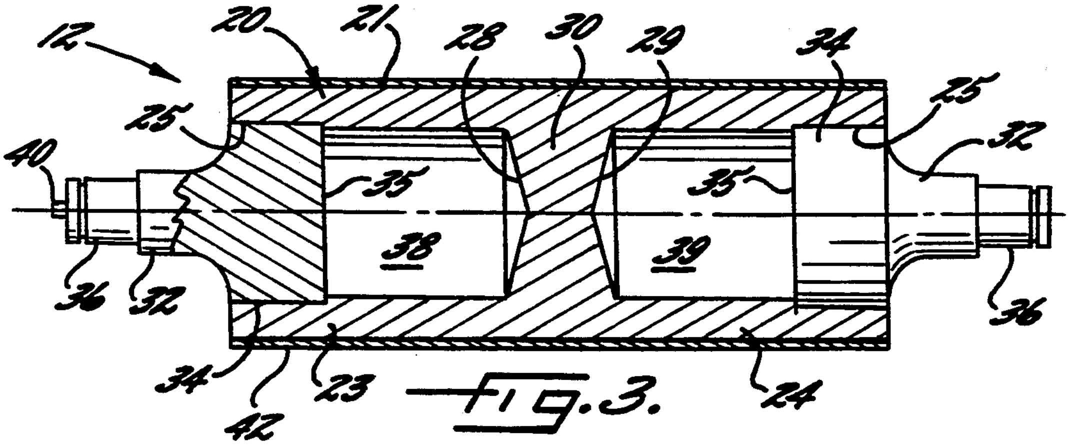
FIG. 3 is a partially sectioned view of the ink transfer roll shown in FIG. 1.

The structure of the lightweight roll 12 of the present invention is best seen in FIGS. 2 and 3. As there illustrated, the roll 12 comprises a metallic body member 20 which includes an outer cylindrical surface 21, and tubular opposite ends portions 23, 24. Each tubular end portion 23, 24 has a counterbore 25 at its outer end. In addition, the tubular end portions 23, 24 have inner end walls 28, 29 which are axially spaced from each other so as to form a solid medial portion 30 which is integrally formed with the remainder of the material of the body member. The solid medial portion 30 thus forms the closed inner end walls 28, 29 for the tubular end portions, and as will be seen, the solid medial portion 30 also forms an integral mid span stiffener in the roll. Also, it will be seen that the body member 20 is formed of a monolithic piece of metallic material which includes the outer cylindrical surface 21, the tubular opposite end portions 23, 24, and the solid medial portion 30 which forms the mid span stiffener.

A header 32 is fixed in each of the tubular end portions 23, 24, with each of the headers 32 including a cylindrical mounting end portion 34 which defines a transverse inner end surface 35, and a journal 36 at the opposite end portion of the header. The mounting end portion 34 and the journal 36 of each header are coaxial with each other so as to define a central axis for each header. The mounting end portions 34 of the headers 32 are mounted in the counterbores 25 of the body member by means of a press fit, and so that the journals 36 of the two headers 32 are coaxially aligned with each other and with the outer cylindrical surface of the body member. Also, each inner end surface 35 opposes the inner end walls 28, 29 of the associated tubular end portion 23, 24, and each inner end surface 35 is axially spaced from the inner end wall of the associated tubular end portion a substantial distance so as to leave an open void 38, 39 therebetween. Preferably, the two open voids collectively have a total axially length which equals at least about ½ of the axial length of the body member. At least one of the headers 32 includes a transverse drive tang 40 formed at its outer end so as to be adapted to be received by a driving mechanism (not shown) of the printing apparatus 10.

The roll 12 further comprises an outer covering layer 42 overlying the outer cylindrical surface 21 of the body member 20, and so as to define an outer surface. A plurality of ink metering cells 44 (FIGS. 7A–7C) are formed in the outer surface of the outer covering layer 42, and the depth of the ink metering cells is less than the overall thickness of the outer covering layer.

Ink transfer rolls of the described type typically have a length of between about 10 and 60 inches, and a diameter of between about 3 to 6 inches. In accordance with the present invention, the roll 12 preferably consists essentially of a lightweight metal such as aluminum or aluminum alloy. A high tensile strength aluminum, such as that sold by Alcoa under the designation 7075 T 651 has been found to be particularly suitable. The covering layer 42 may consist essentially of aluminum oxide 42A (FIG. 7A), or a flame sprayed ceramic 42B such as chromium oxide (FIG. 7B). As a further embodiment, the covering layer 42 may comprise a layer of aluminum oxide and a layer of flame sprayed ceramic overlying the layer of aluminum oxide, as indicated at 42C in FIG. 7C. In this latter embodiment, the depth of the ink metering cells 44 is preferably less than the overall thickness of the ceramic layer. The ink metering cells 44 are preferably formed by a laser engraving operation as further described below and they have a predetermined cell geometry and volume.

Figure 4A:
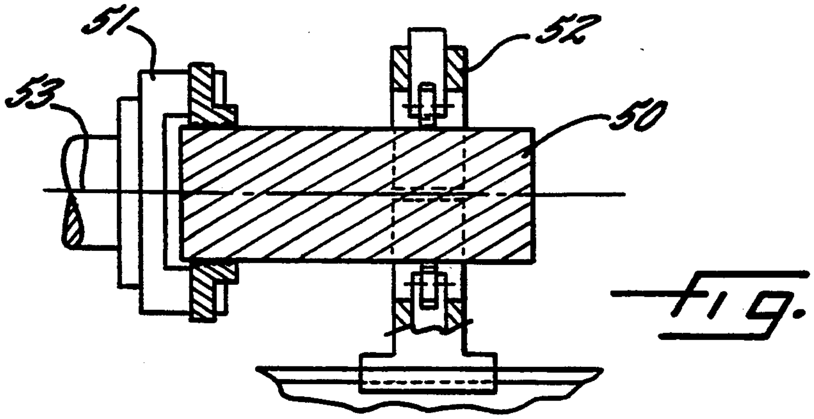
FIGS. 4A–4H schematically illustrate the steps of the preferred method of fabricating the roll in accordance with the present invention.

FIGS. 4A through 4H illustrate the initial steps involved in the preferred method of fabricating the above described lightweight roll. More particularly, FIG. 4A illustrates the initial step of mounting a solid aluminum base roll 50 so as to extend between the head stock 51 and a steady rest tool post 52 of an engine lathe. By this arrangement, the outside surface of the solid base roll may be brought into a closely concentric relationship with the axis 53 of the engine lathe.

Figure 4B:
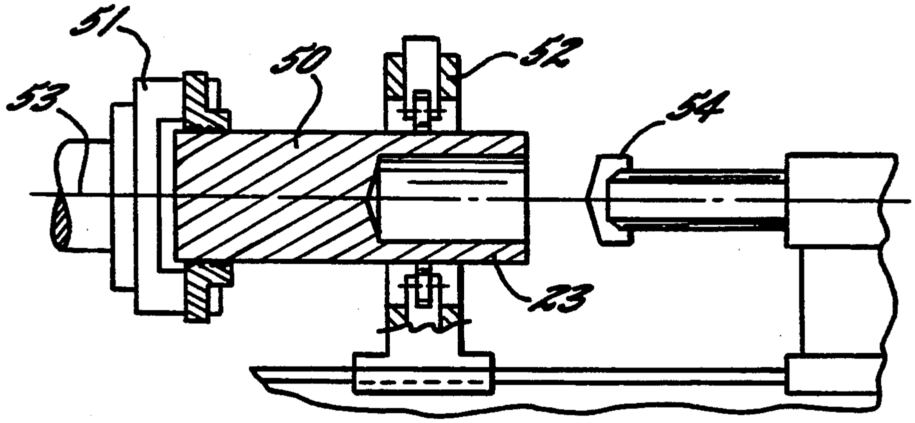

As illustrated in FIG. 4B, material is then removed from each of the ends of the base roll 50 so as to form the tubular opposite end portions 23, 24 which are aligned coaxially with each other along the central axis of the lathe. For this purpose, a spade drill 54 is mounted in the tail stock 56 of the lathe, which is then axially advanced so as to drill into the end of the rotating base roll a distance somewhat less than ½ the axial length of the roll.

Figure 4C:
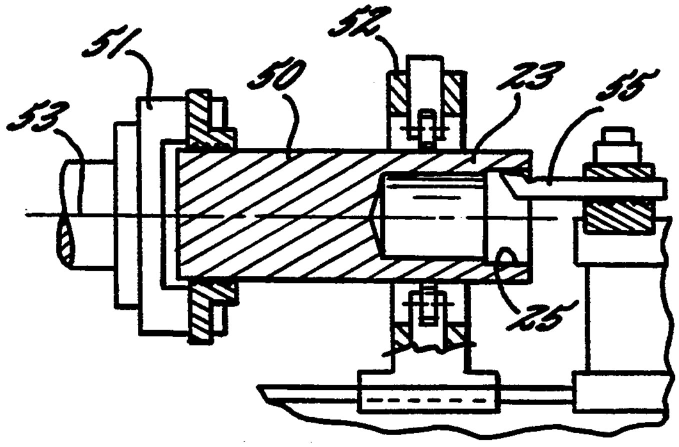

As illustrated in FIG. 4C, a tool 55 may thereafter be mounted in the tail stock 56 so as to form the counterbore 25 which is coaxial with the tubular end portion 23.

Figure 4D:
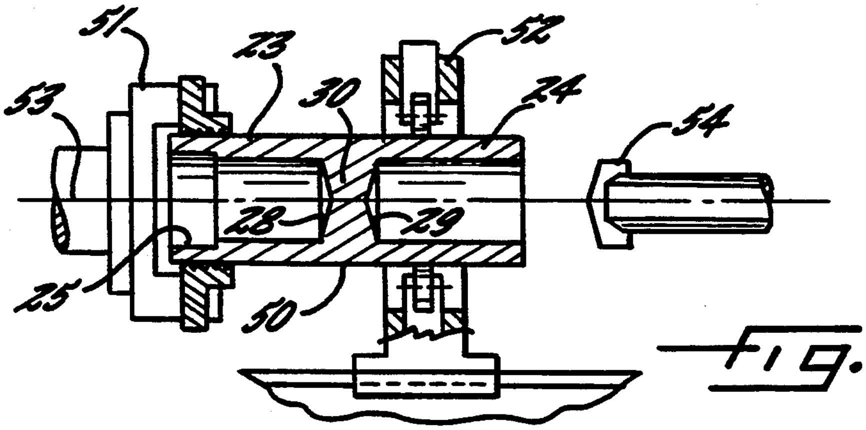

As illustrated in FIG. 4D, the base roll is then axially reversed on the engine lathe, so that the drilling and counterboring steps may be repeated at the opposite end of the base roll. As a result, the solid medial portion 30 of the base roll is formed between the tubular end portions 23, 24, and the solid medial portion defines the outwardly facing inner end walls 28, 29 as described above.

Figure 4E:
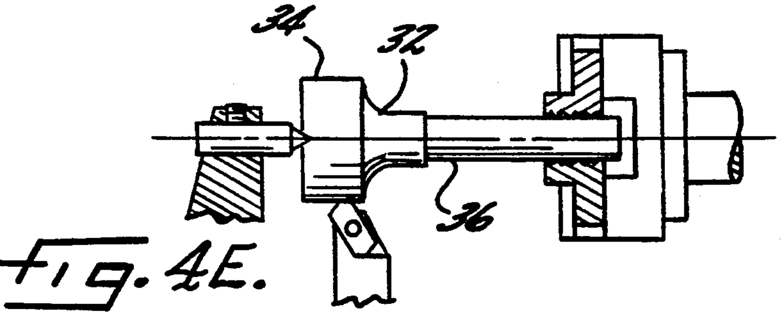

The headers 32 are next fabricated and assembled to the base roll 50 in the manner illustrated in FIGS. 4E through 4H. In particular, and as seen in FIG. 4E, each header 32 is machined so as to define the cylindrical mounting end portion 34 and the coaxial journal 36 at the opposite end portion, and so as to also define the central axis of the header. The mounting end portion 34 of the header, by design, has a diameter which is slightly larger than the inside diameter of the counterbore 25 of the body member, typically by about 0.007 inches. More particularly, the inside diameter of counterbore 25 of one of the tubular end portions 23, 24 is measured, and the cylindrical mounting end portion 34 of the associated header is then machined so as to have an outside diameter of a predetermined dimension larger than the actually measured inside diameter of the counterbore. The inside diameter of the other counterbore is then measured, and the cylindrical mounting end portion of the other header is then machined so as to have an outside diameter of a predetermined dimension larger than that of the measured inside diameter of the counterbore.

Figure 4F:
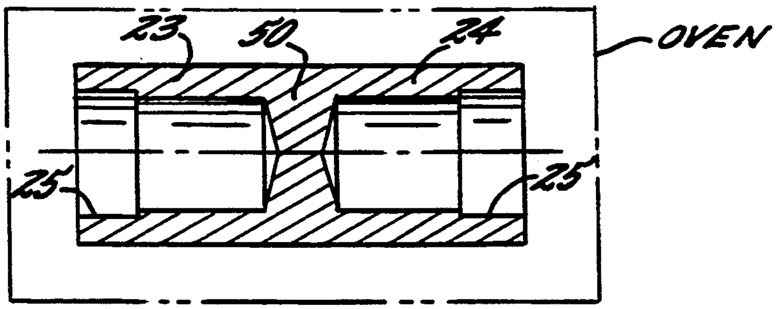
Figure 4G:
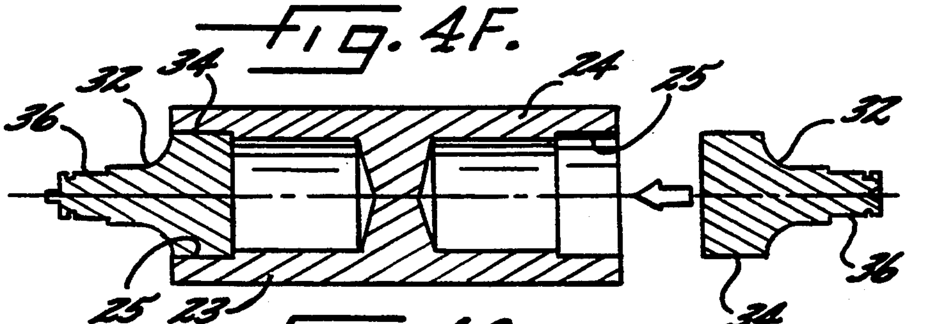

The base roll 50 is then heated as schematically illustrated in FIG. 4F, so as to enlarge the inside diameters of the counterbores 25 by an amount sufficient to accommodate the mounting end portion 34 of the matched headers 32, and the headers are then assembled in the associated counterbores in the manner illustrated in FIG. 4G. Upon cooling, the headers will be retained in the tubular end portions with a press fit.

Figure 4H:
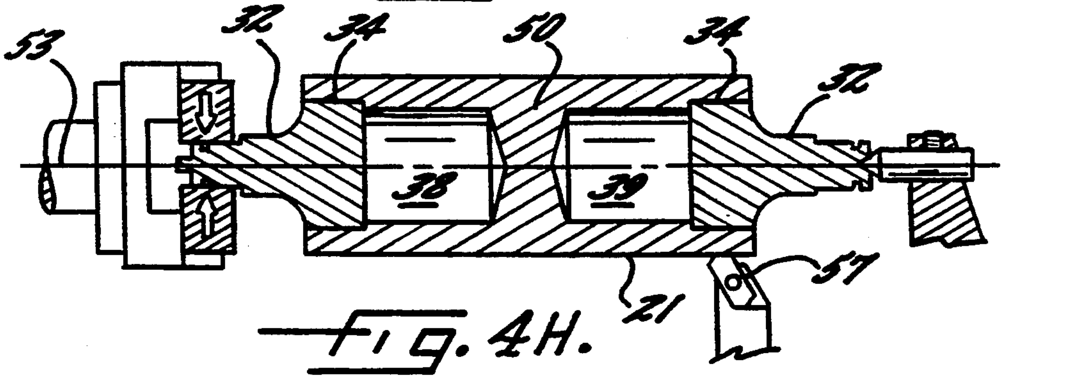

The assembly of the base roll and two headers is then mounted on the engine lathe, with the coaxial axes of the headers aligned with the central axis 53 of the lathe, note FIG. 4H. The outer surface of the base roll is then machined by rotating the assembly about the machine axis and while feeding a cutting tool 57 axially along the outer surface of the base roll. By this procedure the outer finished cylindrical surface 21 is formed which is, within very close tolerances, concentric to the coaxial axes of the headers 32. This in turn produces a dynamically balanced roll, without a post manufacturing balancing operation.

Figure 5A:
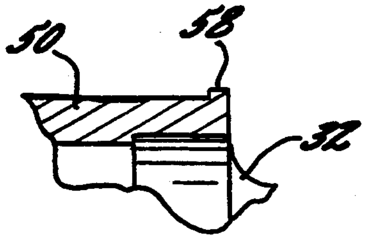
FIGS. 5A and 5B schematically illustrate two embodiments of a shoulder which may be formed at each of the ends of the roll.
Figure 5B:
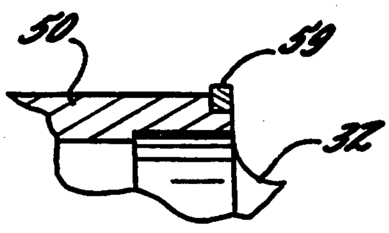

In certain embodiments of the invention as further described below, it is desirable to form an external circumferential shoulder at each of the ends of the roll. As illustrated in FIG. 5A, an integral shoulder 58 may be formed during the machining operation of FIG. 4H. FIG. 5B illustrates an alternative embodiment wherein a separate ring 59 of, for example stainless steel, is mounted in an annular channel at each end of the roll.

Figure 6A:
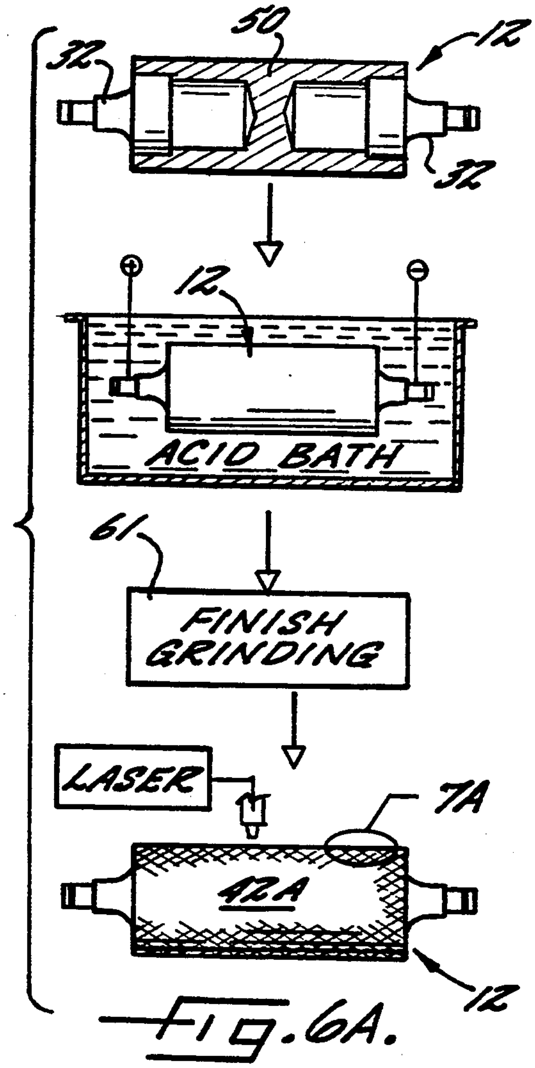
FIG. 6A schematically illustrates the steps of a method for forming an outer covering layer on the outer surface of the base roll.

After the headers 32 have been inserted and the roll is fully assembled, with the outer surface 21 being finished in the manner described above, the entire assembly may be anodized to form a hard and wear resistant surface layer in the manner illustrated in FIG. 6A. The anodization process comprises immersing the roll in an acid bath, such as sulfuric acid, and then passing a DC current through the immersed roll. As a result, all exposed areas of the aluminum base roll and headers are electrolytically treated to form a layer 42A (FIG. 7A) of aluminum oxide approximately 0.001 to 0.002 inches in thickness. Processes for such anodization of the roll assembly are known in the art, note for example U.S. Pat. No. 4,567,827, and Military Specification MIL-A-8625E entitled "Anodic Coatings for Aluminum and Aluminum Alloys", the disclosures of which are incorporated by reference. By this process, an outer covering layer 42A (FIG. 7A) of aluminum oxide is formed that is chemically bonded to the outer cylindrical surface 21 of the base aluminum roll, and which protects the roll from the deleterious effects of corrosion and wear. In addition, because the covering layer 42A is chemically bonded, it is not prone to flaking which can occur with some mechanically bonded coverings.

The anodization process also forms a hard layer of aluminum oxide on the exposed sections of the headers 32. Thus the journals 36 are hardened and can withstand prolonged and high speed use without undue wear. Similarly, the drive tang 40 is less likely to be "rounded off" during repeated attachment and reattachment to the driving mechanism.

Subsequent to anodization, and as also illustrated in FIG. 6A, the roll is subjected to a laser engraving process, wherein a laser engraving apparatus directs bursts of light energy at the outer peripheral surface and cavitates small cells 44 in the layer of aluminum oxide. In the art of printing, it is often advantageous to precisely control the density, volume and geometry of the ink metering cells and the laser engraving apparatus allows very precise cell formation. For example, screen counts from 45 to 1,000 lines of cells per inch and cell volumes from 1 to 50 BCM are possible. In addition, the cell geometry can be varied from 30 to 60 degrees. Laser engraving apparatus which are capable of performing the engraving operation are commercially available, one example being the 3.5 Meter Lasertech engraver, manufactured by Baasel Lasertechnik GmbH, of Itzehohe, Germany.

Figure 7A:
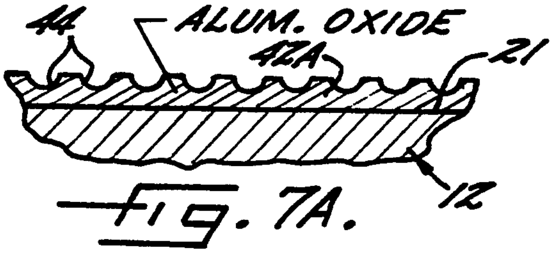
FIGS. 7A and 7B are fragmentary sectional views illustrating two embodiments of the outer covering layer, taken within the rings 7A and 7B of FIGS. 6A and 6B respectively.
Figure 7B:
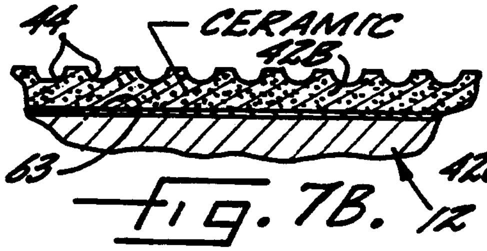

As best shown in FIG. 7A, the ink metering cells 44 are formed in the layer 42A of aluminum oxide to a depth less than the thickness of the layer of aluminum oxide so that, when viewed in longitudinal cross section, the interface between the layer of aluminum oxide and the outer cylindrical surface 21 of the aluminum base roll is substantially linear. The depth of the cells 44 is typically between about 10 to 50 microns. Thus, the lightweight aluminum base roll is protected by a corrosion and wear resistant outer covering that has the ink metering cells formed therein.

In order to achieve the desired uniformity of the geometry of the cells from the laser engraving process, the exterior surface of the roll must be smooth and closely concentric with the central axis defined by the journals 36, i.e. the exterior surface must run true with the journals. To achieve these surface characteristics, the outer surface of the coating layer 42A is preferably subjected to a finish grinding operation after the anodization process and as indicated schematically at 61 in FIG. 6A.

Figure 6B:
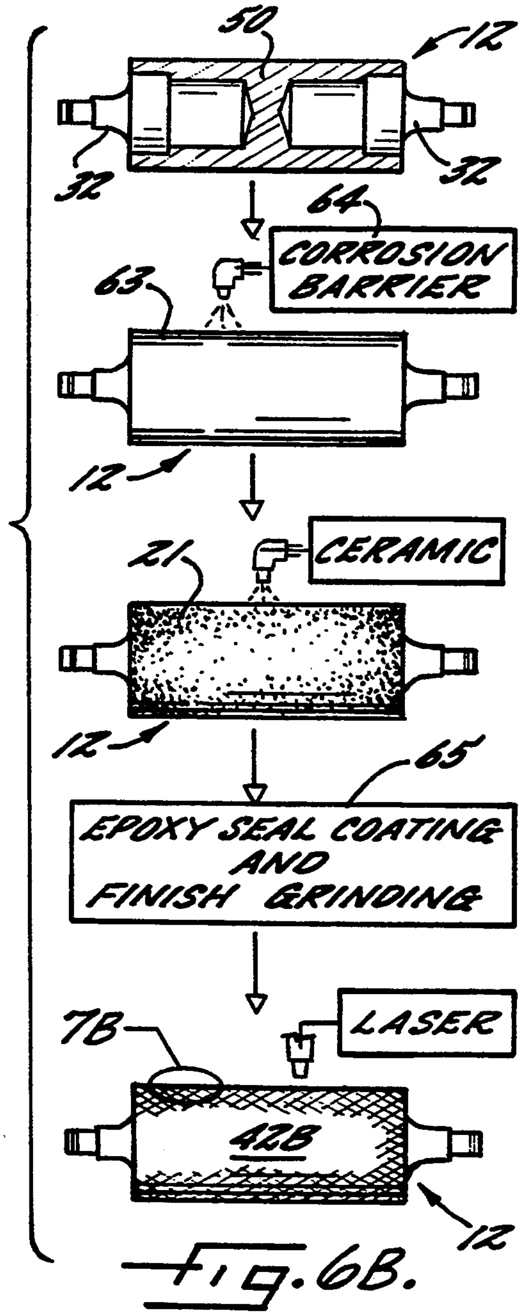
FIG. 6B schematically illustrates the steps of a second embodiment of a method for forming the outer covering layer on the base roll.

In an alternative embodiment as illustrated in FIG. 6B, the outer surface 21 of the base roll is plasma flame sprayed with a suitable ceramic, such as chromium oxide, thereby forming an outer covering layer 42B of chromium oxide as illustrated in FIG. 7B. The layer of chromium oxide is typically formed to a thickness of between about 0.008 to 0.010 inches. The outer peripheral surface of the outer covering layer 42B is subsequently laser engraved as illustrated in FIG. 6B to form the ink metering cells, as best shown in FIG. 7B. Here again, the depth of the cells which is typically between about 10 to 50 microns, is less than the thickness of the ceramic coating layer.

To enhance the corrosion resistance of the ceramic coated roll, the roll and journals may first be coated with a film of pure nickel or other suitable metal which forms a corrosion barrier coating. This layer 63 (FIG. 7B) may be applied by a conventional electroless nickel spray application process and as schematically illustrated at 64 in FIG. 6B. Also, the ceramic coated roll may be coated with a suitable epoxy so as to fill any surface gaps and thus seal the ceramic layer 42B against the penetration of the caustic chemicals found in many water based inks from reaching the underlying aluminum surface of the base roll. The ceramic layer is then finish ground so as to insure the desired uniformity of the geometry of the cells in the manner described above with respect to the embodiment of FIG. 6A. These operations are illustrated schematically at 65 in FIG. 6B.

The embodiment of FIG. 6B may incorporate a circumferential shoulder 58, 59 as seen in FIGS. 5A or 5B. In particular, the shoulders should have a height corresponding to the thickness of the ceramic layer 42B, so that the ceramic layer is flush with the outer periphery of the shoulders. The shoulders thus serve to provide protection against chipping of the edges of the ceramic layer, as well as protection against chemical penetration into the otherwise exposed ends of the ceramic layer.

Figure 7C:
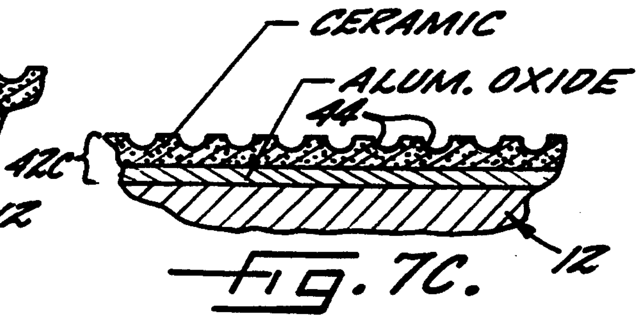
FIG. 7C is a view similar to FIGS. 7A and 7B but illustrating a further embodiment of the covering layer.

In a further embodiment which is illustrated in FIG. 7C, the base roll 50 is first treated in the manner illustrated in FIG. 6A to form a layer of aluminum oxide which has a thickness of about 0.001 to 0.002 inches and which is chemically bonded to the outer cylindrical surface of the base roll. The resulting roll is then plasma flame sprayed with chromium oxide or other suitable ceramic so as to form an outer layer having a thickness of about 0.008 to 0.010 inches. The cylindrical surface 21 of the base roll is thereby coated with a composite covering layer 42C which is composed of an inner layer of aluminum oxide which is chemically bonded to the outer cylindrical surface of the base roll and an outer layer of chromium oxide which is mechanically bonded to cover the aluminum oxide layer. The outer peripheral surface of the chromium oxide layer is then laser engraved to form the ink metering cells to a depth of 10 to 50 microns in the manner described above.

In the drawings and specification, preferred embodiments of the invention have been illustrated and described, and although specific terms are employed, they are used in a generic and descriptive sense and not for purposes or limitation.

That which is claimed is:

1. A lightweight roll comprising a body member formed of a monolithic piece of metallic material and which includes an outer cylindrical surface, tubular opposite end portions, and a solid medial portion which forms a closed inner end wall for each of said tubular end portions, and a header fixed in each of said tubular end portions and with each of said headers including an external journal, with the journals of said headers being coaxially aligned with each other and with said outer cylindrical surface of said body member, and wherein each of said headers includes a closed inner end surface which opposes said inner end wall of the associated tubular end portion, and with said inner end surface of each of said headers being axially spaced from the inner end wall of the associated tubular end portion a substantial distance so as to leave a void therebetween.

2. The lightweight roll as defined in claim 1 wherein said voids collectively have a total axial length which equals at least about one half of the axial length of said body member.

3. The lightweight roll as defined in claim 1 further comprising an outer covering layer overlying said outer cylindrical surface of said body member and so as to define an outer surface, and a plurality of ink metering cells formed in said outer surface of said outer covering layer, and wherein the depth of said ink metering cells is less than the overall thickness of said outer covering layer.

4. The lightweight roll as defined in claim 3 wherein said body member and said headers each consist essentially of aluminum or aluminum alloy.

5. The lightweight roll as defined in claim 4 wherein said outer covering layer comprises a layer of flame sprayed ceramic.

6. The lightweight roll as defined in claim 5 wherein said outer covering layer further comprises a corrosion barrier coating between said outer cylindrical surface of said body member and said layer of flame sprayed ceramic.

7. The lightweight roll as defined in claim 5 wherein said outer cylindrical surface of said body member defines opposite ends, and said body member includes an external annular shoulder positioned at each of said ends, with each of said shoulders having an outer periphery which is flush with the outer surface of said layer of ceramic.

8. The lightweight roll as defined in claim 4 wherein said outer covering layer comprises a layer of aluminum oxide.

9. The lightweight roll as defined in claim 8 wherein said outer covering layer further comprises a layer of flame sprayed ceramic covering said layer of aluminum oxide, with said ink metering cells being formed totally in said layer of flame sprayed ceramic.

10. The lightweight roll as defined in claim 4 wherein said outer covering layer has a thickness of between about 0.006 and 0.020 inches, and said ink metering cells have a depth of between about 3 and 300 microns.

11. The lightweight roll as defined in claim 10 wherein said ink metering cells are laser engraved and have a predetermined cell volume of between about 1 and 50 BCM, and a screen count of between about 45 and 1000 LPI.

12. The lightweight roll as defined in claim 4 wherein said outer covering layer comprises a layer of aluminum oxide chemically bonded directly to said outer cylindrical surface of said body member, and wherein the interface between said layer of aluminum oxide and said outer cylindrical surface of said body member is substantially linear when viewed in longitudinal cross section.

13. The ink transfer roll as defined in claim 12 wherein said outer covering layer comprises said layer of aluminum oxide and a layer of flame sprayed ceramic overlying said layer of aluminum oxide, and wherein the depth of said ink metering cells is less than the overall thickness of said layer of flame sprayed ceramic.

14. The ink transfer roll as defined in claim 12 wherein said outer covering layer consists essentially of said layer of aluminum oxide.

15. The lightweight roll as defined in claim 12 wherein said ink metering cells are laser engraved and have a predetermined cell volume.

16. The lightweight roll as defined in claim 15 wherein said outer covering layer has a thickness of between about 0.001 and 0.002 inches, and said ink metering cells have a depth of between about 10 and 50 microns.

* * * * *